US008968433B2

(12) United States Patent
Chandran

(10) Patent No.: US 8,968,433 B2
(45) Date of Patent: Mar. 3, 2015

(54) GASIFIER HAVING INTEGRATED FUEL CELL POWER GENERATION SYSTEM

(75) Inventor: Ravi Chandran, Ellicott City, MD (US)

(73) Assignee: Thermochem Recovery International, Inc., Baltimore, MD (US)

(*) Notice: Subject to any disclaimer, the term of this patent is extended or adjusted under 35 U.S.C. 154(b) by 0 days.

(21) Appl. No.: 13/309,354

(22) Filed: Dec. 1, 2011

(65) Prior Publication Data

US 2012/0094198 A1    Apr. 19, 2012

Related U.S. Application Data

(63) Continuation of application No. PCT/US2010/037127, filed on Jun. 2, 2010.

(60) Provisional application No. 61/183,401, filed on Jun. 2, 2009.

(51) Int. Cl.
*B01J 7/00* (2006.01)
*F02C 3/28* (2006.01)
(Continued)

(52) U.S. Cl.
CPC .............. *F02C 3/28* (2013.01); *H01M 8/0631* (2013.01); *H01M 8/0643* (2013.01); *C10J 3/482* (2013.01); *C01B 3/44* (2013.01); *H01M 2008/1293* (2013.01); *Y02E 50/12* (2013.01);
(Continued)

(58) Field of Classification Search
CPC ............... H01M 8/0631; H01M 8/225; C10J 2300/1646
USPC ............................ 422/129–242; 429/400–535
See application file for complete search history.

(56) References Cited

U.S. PATENT DOCUMENTS 2,570,543 A      10/1951  Gorin
2,581,650 A  *   1/1952   Gorin ............................ 429/426
(Continued)

FOREIGN PATENT DOCUMENTS

FR          1340155          10/1963
GB          930 103 A         7/1963
(Continued)

OTHER PUBLICATIONS

International Search Report in PCT/US2010/037127, dated Jul. 30, 2010.
(Continued)

*Primary Examiner* — Imran Akram
(74) *Attorney, Agent, or Firm* — Womble Carlyle

(57) ABSTRACT

A direct carbonaceous material to power generation system integrates one or more solid oxide fuel cells (SOFC) into a fluidized bed gasifier. The fuel cell anode is in direct contact with bed material so that the $H_2$ and CO generated in the bed are oxidized to $H_2O$ and $CO_2$ to create a push-pull or source-sink reaction environment. The SOFC is exothermic and supplies heat within a reaction chamber of the gasifier where the fluidized bed conducts an endothermic reaction. The products from the anode are the reactants for the reformer and vice versa. A lower bed in the reaction chamber may comprise engineered multi-function material which may incorporate one or more catalysts and reactant adsorbent sites to facilitate excellent heat and mass transfer and fluidization dynamics in fluidized beds. The catalyst is capable of cracking tars and reforming hydrocarbons.

20 Claims, 1 Drawing Sheet

(51) Int. Cl.
　　　*H01M 8/06*　　　(2006.01)
　　　*C10J 3/48*　　　(2006.01)
　　　*C01B 3/44*　　　(2006.01)
　　　*H01M 8/12*　　　(2006.01)
　　　*C10J 3/62*　　　(2006.01)

(52) U.S. Cl.
　　　CPC ............... *Y02T 50/672* (2013.01); *C10J 3/62* (2013.01); *C10J 2300/1246* (2013.01); *C10J 2300/1276* (2013.01); *C10J 2300/1606* (2013.01); *C10J 2300/1612* (2013.01); *C10J 2300/1646* (2013.01); *C10J 2300/1653* (2013.01); *C01B 2203/0233* (2013.01); *C01B 2203/0283* (2013.01); *C01B 2203/0425* (2013.01); *C01B 2203/066* (2013.01); *Y02E 60/50* (2013.01); *Y02E 20/185* (2013.01); *Y02E 60/525* (2013.01); *Y02E 20/16* (2013.01); *Y02E 20/18* (2013.01)
　　　USPC ............................................................ 48/61

(56) References Cited

U.S. PATENT DOCUMENTS

| | | | | |
|---|---|---|---|---|
| 3,180,813 | A * | 4/1965 | Wasp et al. | 205/343 |
| 4,268,363 | A * | 5/1981 | Coughlin | 205/367 |
| 4,279,710 | A * | 7/1981 | Coughlin | 205/343 |
| 4,721,556 | A | 1/1988 | Hsu | |
| 5,376,469 | A | 12/1994 | Guer et al. | |
| 6,183,896 | B1 * | 2/2001 | Horita et al. | 429/425 |
| 6,680,137 | B2 | 1/2004 | Paisley | |
| 2003/0175561 | A1 * | 9/2003 | Lightner | 429/17 |
| 2004/0009378 | A1 * | 1/2004 | Lightner | 429/17 |
| 2004/0023085 | A1 * | 2/2004 | Lightner | 429/17 |
| 2006/0166053 | A1 | 7/2006 | Badding et al. | |
| 2006/0257702 | A1 | 11/2006 | Guer | |
| 2007/0117005 | A1 * | 5/2007 | Fuglevand et al. | 429/40 |
| 2007/0245627 | A1 * | 10/2007 | Chandran | 48/89 |
| 2008/0022593 | A1 * | 1/2008 | Gur et al. | 48/116 |
| 2008/0196308 | A1 * | 8/2008 | Hutton et al. | 48/210 |
| 2009/0004529 | A1 | 1/2009 | Gur et al. | |
| 2010/0055510 | A1 * | 3/2010 | Kobayashi et al. | 429/13 |
| 2010/0129691 | A1 * | 5/2010 | Dooher et al. | 429/17 |
| 2010/0158794 | A1 * | 6/2010 | Steer | 423/651 |

FOREIGN PATENT DOCUMENTS

| | | |
|---|---|---|
| JP | 2005-330370 | 12/2005 |
| JP | 2007 284476 A | 11/2007 |
| WO | WO 97/44410 | 8/2000 |
| WO | WO 2007113311 A1 * | 10/2007 |
| WO | WO 2007/127679 | 11/2007 |

OTHER PUBLICATIONS

Written Opinion in PCT/US2010/037127, dated Jul. 30, 2010.
Extended European search report dated Feb. 18, 2014 issued in European counterpart application (No. 10784037.3).
Official action dated Sep. 9, 2014 issued in Japanese counterpart application (No. 2012-514101).

* cited by examiner

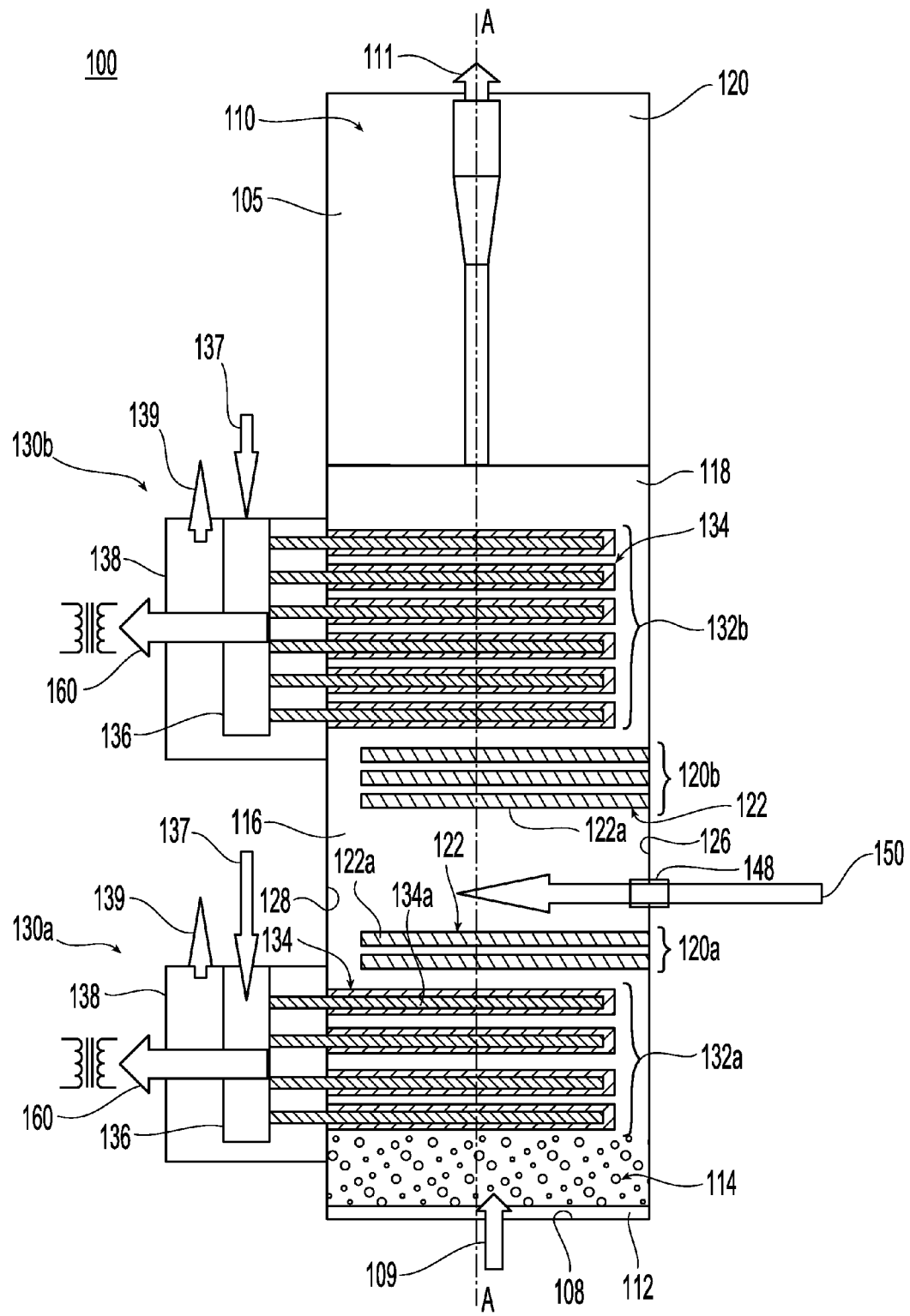

GASIFIER HAVING INTEGRATED FUEL CELL POWER GENERATION SYSTEM

RELATED APPLICATIONS

This is a Continuation of International Patent Application No. PCT/US2010/037127, which was filed Jun. 2, 2010 and published as WO 2010/141629A1 on Dec. 9, 2010, and which claims priority to U.S. Provisional Application No. 61/183, 401, filed 2 Jun. 2009. The contents of the aforementioned applications are incorporated by reference in their entirety.

FIELD OF THE INVENTION

The present invention is directed to a system and method for converting a carbonaceous material into a product gas having an integrated full cell for power generation.

BACKGROUND

Gasifiers, such as those employing fluidized beds, have been used to convert carbonaceous materials into a product gas. The objective in gasification is to maximize the conversion of feedstock into syngas i.e., H2 and CO. This requires that either the formation of condensables or tars and light hydrocarbons is minimized or that these are converted in-situ. Many investigators have developed catalysts to crack tars and/or reform hydrocarbons in steam reforming, autothermal reforming and partial oxidation modes of reactor operation. The key performance targets are conversion, yield, selectivity and activity and the challenge is to maintain performance with negligible or minimal loss of activity. The potential factors that can lead to catalyst deactivation or degradation are: attrition or decrepitation of the particle or catalyst layer, sintering, agglomeration, coke formation and poisoning due to feedstock impurities (H2S, COS, HCl, NH3, HCN, etc.). Some recent reviews include:

Gerber, M. A., "Review of Novel Catalysts for Biomass Tar cracking and methane Reforming", Pacific Northwest National Laboratory Report PNNL-16950, October 2007.

Fang, H., Haibin, L., and Zengli, Z., "Advancements in Development of Chemical-Looping Combustion: A Review', Intl. J. Ch. E., Volume 2009 (2009), Article ID 710515.

Kolb, G., "Fuel Processing: for fuel cells", Technology & Engineering, 2008, 424 pages.

Advanced catalysts which can operate under the adverse conditions of gasification chambers are described in the following U.S. published patent applications, whose contents are incorporated by reference: US20080041766A1, US20070116639A1 and US20090209412A1.

US20080041766A1 to Giroux et al. teaches a method of reforming a sulfur containing hydrocarbon involves contacting the sulfur containing hydrocarbon with a sulfur tolerant catalyst containing a non-sulfating carrier and one or more of a sulfur tolerant precious metal and a non-precious metal compound so that the sulfur tolerant catalyst adsorbs at least a portion of sulfur in the sulfur containing hydrocarbon and a low sulfur reformate is collected, and contacting the sulfur tolerant catalyst with an oxygen containing gas to convert at least a portion of adsorbed sulfur to a sulfur oxide that is desorbed from the sulfur tolerant catalyst. This invention is intended to be carried out in a simple reactor or a swing reactor but not a fluidized bed.

US20070116639A1 to Lomax et al. teaches the preparation of a catalyst that can be used for the production of hydrogen from hydrocarbon fuels in steam reforming processes; the catalyst contains an active metal of, e.g., at least one of Ir, Pt and Pd, on a catalyst support of, e.g., at least one of monoclinic zirconia and an alkaline-earth metal hexaaluminate and it exhibits improved activity, stability in both air and reducing atmospheres, and sulfur tolerance. Preferred reactor type is not indicated but the application seems to suggest a packed bed or fixed bed reactor.

US20090209412A1 to Parent et al. teaches a method of preparing a steam reforming catalyst characterized by improved resistance to attrition loss when used for cracking, reforming, water gas shift and gasification reactions on feedstock in a fluidized bed reactor, comprising: fabricating the ceramic support particle, coating a ceramic support by adding an aqueous solution of a precursor salt of a metal selected from the group consisting of Ni, Pt, Pd, Ru, Rh, Cr, Co, Mn, Mg, K, La and Fe and mixtures thereof to the ceramic support and calcining the coated ceramic in air to convert the metal salts to metal oxides. This is specifically intended for fluid bed application but is made in the form of spherical particles ranging in size from 100 to 1,000 microns by agglomerating catalyst support material. Typically the un-fired agglomerates are composed of catalyst support particles with an average size in the range of 0.3 to 10 microns, preferably in the range of 0.9 to 5 microns.

Heat is required for the gasifier bed to sustain the endothermic reaction of converting the carbonaceous material into the product gas. The heat may be provided by one or more direct or indirect heat sources. In general, such heat sources consume considerable energy.

SUMMARY OF THE INVENTION

In one aspect, the invention is directed to a carbonaceous material gasifier and power generation system. The system comprises a reaction vessel having a longitudinal axis and defining a gasifier chamber suitable for receiving a feedstock comprising a carbonaceous material and producing product gas from the carbonaceous material; and a plurality of fuel cell elements which protrude into the gasifier chamber, the fuel cell elements configured to conduct an exothermic reaction and provide heat sufficient to gasify said carbonaceous material and produce the product gas, while simultaneously generating power.

Each fuel cell element may be in the form of an elongated tube comprising an outer anode, an inner cathode and a ceramic electrode between outer anode and the inner cathode.

At least some of the plurality of fuel cell elements are associated with a fuel cell module. The fuel cell module comprises an oxidant manifold through which one or more of air, $O_2$ and enriched air are supplied to the fuel cell elements; and a spent oxidant plenum configured to provide to the removal of $N_2$ or $O_2$ and/or other gases that were not consumed by the fuel cell elements.

The at least one feedstock inlet can be configured to introduce feedstock into a drying and devolatilization zone within the gasifier chamber.

A plurality of indirect heater conduits may protrude into the gasifier chamber.

In such case, spaced apart first and second sets of indirect heater conduits may protrude into the gasifier chamber from a sidewall thereof; spaced apart first and second sets of fuel cell elements may protrude in the gasifier chamber from a sidewall thereof; and the first and second sets of indirect heater conduits are between the first and second sets of fuel cell elements, along the longitudinal axis of the reaction vessel.

At least one feedstock inlet may be positioned between the first and second sets of indirect heater conduits, the at least one feedstock inlet configured to introduce feedstock into a drying and devolatilization zone within the gasifier chamber.

The first and second sets of indirect heater conduits may protrude into the gasifier chamber from a first wall of the reaction vessel; the first and second sets of fuel cell elements may protrude into the gasifier chamber from a second wall of the reaction vessel, the second wall opposing the first wall; and at least some of the indirect heater conduits and at least some of the fuel cell elements may overlap along the longitudinal axis.

The reaction vessel may have a rectangular cross-section.

In another aspect, the invention is directed to a method of converting a carbonaceous material into a product gas while also generating power. The inventive method comprises: providing an integrated system, comprising the aforementioned reaction vessel and the aforementioned plurality of fuel cell elements; introducing a fluidization medium into the gasifier chamber; introducing a carbonaceous material into a drying and devolatilization zone within the gasifier chamber; and operating the fuel cell elements to create heat sufficient to gasify said carbonaceous material and produce a product gas, while simultaneously generating power.

Prior to operating the fuel cell elements to create heat sufficient to gasify said carbonaceous material, the method may include operating indirect heaters to bring a fluidized bed within the gasifier chamber to a temperature sufficient to gasify said carbonaceous material.

A system in accordance with the present invention may thus include an indirectly-heated fluidized bed gasifier advanced solid oxide fuel cell (SOFC) elements (high surface area per unit volume tubular geometry such as thin and oblong or flattened or airfoil shape) immersed in the bed. Furthermore, the bed may comprise engineered multi-function particles with special heat and mass transfer properties and catalytic and sorption activities.

In yet another aspect, the invention involves the integration of thermochemical, electrochemical and catalytic processes to create a push-pull or source-sink reaction environment to facilitate direct production of electricity from carbonaceous materials. The carbonaceous materials may be gaseous, liquid or solid fuels such as natural gas, propane, methanol, ethanol, dimethyl ether, biomass and other organic feedstocks.

BRIEF DESCRIPTION OF THE FIGURES

FIG. 1 shows an integrated gasifier/fuel cell system in accordance with one embodiment of the present invention.

DETAIL DESCRIPTION

FIG. 1 shows an integrated carbonaceous material to power generation system 100 in accordance with one embodiment of the present invention. The system 100 includes a reaction vessel 105 comprising a gasifier chamber 110 having a longitudinal axis A defining a vertical direction. In some embodiments, the gasifier chamber 110 may be in the form of a steam reformer, of a sort well-known to those skilled in the art.

A distributor 112 is provided at the base 108 of the chamber 110 to facilitate entry of the fluidization medium 109, which may include such items as steam, air, $CO_2$, $O_2$, etc. Above the distributor, the gasifier 110 has a plurality of zones including an enhanced char conversion zone 114 proximate the chamber base, a drying and devolatilization zone 116 above the enhanced char conversion zone 114, and a dense fluid bed zone 118 above the drying and devolatilization zone 116. Above the dense fluid bed zone 118 is a freeboard area 120 which occupies the upper portion of the chamber 110. The top of the chamber 110 may be configured to permit the exit of product gas 111. One or more cyclones, filters and other equipment (not shown) may be used to separate and/or recover solids from the product gas, in a manner known to those having ordinary skill in art.

In one embodiment, the gasifier bed particles comprise engineered multi-function particles which are porous and lightweight, have active reactant ($H_2$, CO, $H_2O$, $CO_2$, etc.) sorption sites, have excellent heat and mass transfer properties, and may be either catalytic or non-catalytic. The engineered particles may be a composite of ceramics such as alumina and solid adsorbent materials such as zeolites or molecular sieves for gases including $H_2$, CO, $H_2O$ and $CO_2$. Such particles may be manufactured for example via sol-gel processing. Such engineered particles can help reduce the dense bed pressure drop, gas expansion and gas bypassing, lower the fluidization velocity required and facilitate superior gas-solid contact, heat and mass transfer and promote reactions. The engineered particles enable the operation of the chamber with temperature and concentration gradients that are relatively low to very low, and in turn improve fuel or feedstock conversion efficiency. The function of the catalyst is to crack tars and reform hydrocarbons, and catalysts such as those described in the Background section may be suitable. Furthermore, specially formulated sorbents (once through or regenerable) may be injected into the fluid bed to capture contaminants.

A feedstock inlet 148 is provided in a sidewall 126 of the reaction vessel 105 for introducing feedstock 150 into the drying and devolatilization zone 116 of the chamber 110. While only a single feedstock inlet 148 is shown, it is understood that a plurality of such inlets may be provided, each inlet for introducing feedstock. The feedstock 150 is introduced into the drying and devolatilization zone 116, combined with the fluidization medium and is conveyed in an upward direction towards the fuel cell elements 134 (described below), which are exothermic and transfer heat to the dense fluid bed zone 118.

One or more spaced apart fuel cell modules 130a, 130b are attached to the reaction vessel 105. Each fuel module comprises a set 132a, 132b of one or more fuel cell elements 134 which protrude into the chamber 110. Each fuel cell module 130a, 130b comprises an oxidant manifold 136 through which fuel cell inlet gases 137 such as one or more of air, $O_2$ and enriched air are supplied to the fuel cell elements 134. The fuel cell module may also include a spent oxidant plenum 138 for the removal of fuel cell exhaust gases 139 such as $N_2$, leftover $O_2$ and the like that were not consumed by the fuel cell elements 134. While two such fuel cell modules 130a, 130b are shown in FIG. 1, each outputting power 160, it is understood that a single fuel cell module, or even a collection of individual fuel cell elements, would suffice.

The fundamental building block for a fuel cell comprises an electrolyte layer in contact with a porous anode on one side and a porous cathode on the other side. In the embodiment shown, each fuel cell element 134 is in the form of an elongated tube 134a comprising an outer anode, an inner cathode and a ceramic electrolytic electrode in-between. In the case of the SOFC, the ceramic electrolyte has an oxygen ion void in the lattice that causes the ceramic to become an oxygen ion-conducting electrolyte. In this regard it has similarities to the electron void found in materials used as semi-conductors. The equilibrium potential developed by the cell can be calculated by using the Nernst equation. The actual potential generated, however, is lower than the equilibrium potential due to irreversible losses. The cell voltage and the power density of the fuel cell will vary with pressure, temperature, reactant (fuel and oxidant) type, composition and utilization, current density and impurities and their concentration. The SOFC elements each comprise two electrodes (outer anode and inner cathode) and an electrolyte in between. The anodes are in direct contact with the reformer bed material and the cathodes are supplied with oxidant (air; O2 or enriched air—optional).

The chamber 110 utilizes superheated steam as the main fluidizing medium (CO2, O2 and/or air are optional) and the heat provided by electrochemical oxidation to convert the fuel or feedstock. The injected fuel or feedstock undergoes one or more of the steps of drying, devolatilization, gasification, tar cracking and hydrocarbon reforming reactions to generate a product gas comprising primarily H2, CO and CO2, and to a limited extent hydrocarbon gases (fixed gases such as CH4, C2+ and condensable vapors or tars); depending upon the fuel or feedstock and the operating conditions (pressure, temperature and the fluidization medium), the additional constituents of the product gas may be HCl, H2S, NH3, HCN, COS, and alkali and trace metal vapors. The H2 and CO generated in the fluidized bed are electrochemically oxidized at the anodes of the SOFC (due to oxygen ion transport from the cathodes) to H2O and CO2 to create a push-pull or source-sink reaction environment.

Meanwhile, the SOFC fuel cell elements 134 operate in exothermic mode and supply heat to the chamber 110 which operates in the endothermic mode and thus requires heat. Thus, the products from the anode of the fuel cell elements 134 are the reactants for the reformer and vice versa. Due to fluid bed mode and coupled operation, the SOFC thermal management in some embodiments of the present invention can become simpler and more efficient.

As mentioned above, the configuration shown in FIG. 1 partitions the chamber 110 into distinct reaction zones, including on zone conducive to drying and devolatilization of the feedstock and another promote char reaction and carbon conversion, as disclosed in US Patent Application Pub. No. US 2007/0245627 A1 dated Oct. 25, 2007. This facilitates improvements in syngas yield and composition, carbon conversion and process thermal efficiency and in turn higher throughput for a given chamber. Thus, the chamber operating temperature will nominally be about 800° C. (1,472 F) and may range from 600° C. to 1,000° C., depending on the fuel or feedstock.

Chamber Reactions. The principal groups of reactions in the chamber are:
Drying And Devolatilization
Fuel or feedstock→H2O, H2, CO, CO2, HC Gases, Tars, Char
Catalytic Cracking/Reforming
HC Gases, Tars+H2O+Heat→H2, CO
Gasification
Superheated steam reacts endothermically (consumes heat) with the carbonaceous components of the fuel or feedstock to produce hydrogen and carbon monoxide fuel gases (synthesis gas or syngas):
H2O+C+Heat→H2+CO (steam reforming)
Carbon dioxide reacts endothermically (consumes heat) with the carbonaceous components of the fuel or feedstock to produce carbon monoxide:
CO2+C+Heat→2CO (dry reforming or Boudouard)
Oxidation
Oxygen transported from the cathode to the anode of the SOFC reacts exothermically (releases heat) with carbon monoxide to produce carbon dioxide and with hydrogen to produce water vapor:

H2+½O2→H2O+Heat
CO+½O2→CO2+Heat
Shift Reaction
Water-gas shift reaction also occurs simultaneously with the steam reforming reaction to yield additional hydrogen and carbon dioxide:
H2O+CO→H2+CO2+Heat (water-gas shift)
Secondary Reactions
CO+3H2→CH4+H2O+Heat (methanation)
C+2H2→CH4+Heat (hydrogasification)
H2O+C+Heat→½CH4+½CO2 (gasification)

Depending upon other elements or contaminants (S, Cl, N, heavy/hazardous metals) present in the fuel or feedstock, the syngas produced may include H2S, COS, HCl, NH3, HCN, and metal and alkali vapors. Also certain minerals (Na, K, Ca, Mg, Si, Fe) if present in sufficient concentration could form low melting compounds or eutectics and in turn lead to agglomeration, clinker formation, fouling of internals and defluidization. In these cases, additives such as kaolinite, diatomaceous earth, emathlite, magnesium oxide etc. may be added to the chamber on a continuous basis to tie up the minerals and facilitate good fluidization characteristics.

While only the vessel 105 and its chamber 110 is shown, the overall system 100 is envisioned to also include one ore more of the following: fuel or feedstock preparation, handling and feed subsystem, heat recovery and cold gas cleanup subsystem, optional CO$_2$ capture subsystem, optional gas turbine subsystem, optional bottoming steam cycle subsystem and optional oxygen supply subsystem.

Fuel such as natural gas may be cleaned using sorbent beds etc. to remove sulfur and other impurities, if present. If the feedstock is a solid such as biomass, it is prepared if necessary by shredding (25 mm or 1 inch top size) and drying (~10% moisture) typically using process flue gas. The feed subsystem will include an optional compressor and one or more fuel injectors if the fuel is natural gas, pump and fuel injectors in the case of a liquid fuel and a storage bin, a proprietary plug feeder and injection auger for solid feedstock; the auger will transfer the solid feedstock from the atmospheric pressure bin to the chamber operating at low to moderate pressure (1 to 15 bar gauge). The gasifier subsystem may employ a two-step gasification process. The first stage will be the integrated gasifier-SOFC unit described earlier with internal and external cyclones; a second stage termed a char converter or carbon trim cell (CTC) may be included downstream to gasify fine char and ensure high carbon conversion. This converter operates as a trim fluidized bed with oxygen or air in a sub-stoichiometric mode to gasify the residual carbon. The products from the converter pass through a cyclone to drop out the fly ash. The solid products of reaction (mostly inorganic material) are discharged from this cyclone catch; if the feedstock contains K and P compounds, these are likely to report to this catch stream. The ash from the cyclone catch is cooled and conveyed to storage for disposal. The syngas from the first and second stages are blended together and sent to a clean-up subsystem comprising a heat recovery steam generator (HRSG), followed by a venturi scrubber and gas cooler to remove particulates from the syngas, capture the tars and condense excess steam. The tars are collected and separated by a proprietary solvent-based system and routed to the carbon trim cell to crack and reform. The clean syngas is burned in a second HRSG and the flue gas is routed to the feedstock dryer and then the stack. An optional on-site merchant VPSA oxygen separation plant supplies industrial purity oxygen for the CTC. The high pressure superheated steam generated in the HRSGs are sent to a bottoming steam cycle subsystem to generate power. Alternately, if the fuel is natural gas or liquids, the syngas from the gas cleanup train may be sent to a gas turbine combined cycle for power generation. The gas cleanup step may also include means for $CO_2$ capture and sequestration. The overall system may thus be configured to generate all power or combined heat and power for distributed generation.

Protruding into the chamber 110 from a sidewall 128, are the indirect heater conduits 122A belonging to one or more spaced apart sets 120a, 120B of indirect heater elements 122. While two such sets 120a, 120B are shown, it is understood that only one such set, or simply even a plurality of such indirect heater elements not arranged in any particular manner, may be provided. In some embodiments, the indirect heating elements 122 may comprise pulse combustion heaters driven, for instance, by a portion of the created product gas. In other embodiments, the indirect heating elements 122 may comprise electrical heaters.

The indirect heater elements 122 assist with startup of fluidized bed operations, and also with control of dense fluid bed temperature ("temperature trim"). However, the indirect heater elements 122 generally play no role in supplying heat to sustain gasification (e.g., carbonaceous material-to-product gas) reactions, during steady state operation of the chamber 110.

In the embodiment of FIG. 1, a lower, first fuel cell module 130a is provided immediately above the enhanced char conversion zone 114 and below the lower first set 120a of indirect heater elements 122. Meanwhile, the upper, second fuel cell module 13BA is provided immediately above the upper, second set 120B of indirect heater elements 122. The feedstock 150 is introduced into the drying and devolatilization zone 116 between the lower, first set 120a and the upper, second set 120B of indirect heaters. The feedstock 150 is combined with the fluidization medium and is conveyed in an upward direction towards the fuel cell elements 134. The fuel cell elements 134 may be controlled to maintain the dense fluid bed zone 118 at a desired temperature during steam reforming process which releases the product gas from the feedstock.

A system in accordance with the present invention may realize certain efficiencies. For example, with biomass as the feedstock, a net plant electrical efficiency on the order of 50% on HHV basis may be realized. Such an efficiency is about twice that of conventional steam based biomass power generation and is a significant improvement over the current state of the art. With natural gas, there is potential to achieve a net electrical efficiency on the order of 75% on HHV basis. This has significant implications for energy utilization, energy security and climate change mitigation.

Although the present invention has been described with reference to certain embodiments, it should be understood that various alterations and modifications could be made without departing from the spirit or scope of the invention as hereinafter claimed.

What is claimed is:

1. A carbonaceous material gasifier and power generation system, comprising:
   a reaction vessel having a longitudinal axis (A) extending in a vertical direction and defining a gasifier chamber suitable for receiving a feedstock comprising a carbonaceous material and producing product gas from the carbonaceous material, the gasifier chamber having a fluidized bed and being connected to a source of steam which is in communication with the fluidized bed;
   a freeboard area located vertically above the fluidized bed;
   an outlet coupled to the freeboard area to permit the exit of product gas from the gasifier chamber; and
   a plurality of fuel cell elements which protrude into bed material of the fluidized bed in the gasifier chamber, the fuel cell elements configured to conduct an exothermic reaction and provide heat sufficient to gasify said carbonaceous material and produce the product gas, while simultaneously generating power; wherein:
   each fuel cell element extends in a direction transverse to the longitudinal axis (A); and
   an anode of each fuel cell element is in direct contact with the bed material of the fluidized bed.

2. The system according to claim 1, wherein:
   each fuel cell element is in the form of an elongated tube comprising an outer anode, an inner cathode and a ceramic electrode between outer anode and the inner cathode.

3. The system according to claim 1, wherein:
   at least some of the plurality of fuel cell elements are associated with a fuel cell module; and
   the fuel cell module comprises:
     an oxidant manifold through which one or more of air, $O_2$ and enriched air are supplied to the fuel cell elements; and
     a spent oxidant plenum configured to provide to the removal of $N_2$ or $O_2$ and/or other gases that were not consumed by the fuel cell elements.

4. The system according to claim 1, further comprising:
   at least one feedstock inlet configured to introduce feedstock into a drying and devolatilization zone within the gasifier chamber.

5. The system according to claim 1, further comprising:
   a plurality of indirect heater conduits protruding into the gasifier chamber.

6. The system according to claim 5, wherein:
   spaced apart first and second sets of indirect heater conduits protrude into the gasifier chamber from a sidewall thereof;
   spaced apart first and second sets of fuel cell elements protrude in the gasifier chamber from a sidewall thereof; and
   the first and second sets of indirect heater conduits are between the first and second sets of fuel cell elements, along the longitudinal axis of the reaction vessel.

7. The system according to claim 5, further comprising:
   at least one feedstock inlet positioned between the first and second sets of indirect heater conduits, the at least one feedstock inlet configured to introduce feedstock into a drying and devolatilization zone within the gasifier chamber.

8. The system according to claim 5, wherein:
   the first and second sets of indirect heater conduits protrude into the gasifier chamber from a first wall of the reaction vessel;
   the first and second sets of fuel cell elements protrude into the gasifier chamber from a second wall of the reaction vessel, the second wall opposing the first wall; and
   at least some of the indirect heater conduits and at least some of the fuel cell elements overlap along the longitudinal axis.

9. The system according to claim 8, wherein the reaction vessel has a rectangular cross-section.

10. The system according to claim 5, wherein:
    the indirect heaters generally play no role in supplying heat to sustain gasification reactions, during steady state operation of the gasifier chamber.

11. The system according to claim 1, wherein:
    anodes of the fuel cell elements are in direct contact with the bed material so that the $H_2$ and CO generated in the bed are oxidized to $H_2O$ and $CO_2$, and the $H_2O$ and $CO_2$ react with carbonaceous material to generate $H_2$ and CO to create a push-pull reaction environment.

12. A method of converting a carbonaceous material into a product gas while also generating power, the method comprising:
   providing the system of claim 1;
   introducing a carbonaceous material into a drying and devolatilization zone within the gasifier chamber; and
   operating the fuel cell elements to create heat sufficient to gasify said carbonaceous material and produce a product gas, while simultaneously generating power.

13. The method according to claim 12, comprising:
   prior to operating the fuel cell elements to create heat sufficient to gasify said carbonaceous material, operating indirect heaters to bring a fluidized bed within the gasifier chamber to a temperature sufficient to gasify said carbonaceous material.

14. The method according to claim 13, wherein:
   the indirect heaters generally play no role in supplying heat to sustain gasification reactions, during steady state operation of the gasifier chamber.

15. The method according to claim 12, comprising:
   directly contacting anodes of the fuel cell elements with bed material so that the $H_2$ and CO generated in the bed are oxidized to $H_2O$ and $CO_2$, and the $H_2O$ and $CO_2$ react with carbonaceous material to generate $H_2$ and CO to create a push-pull reaction environment.

16. A carbonaceous material gasifier and power generation system, comprising:
   a reaction vessel having a longitudinal axis (A) extending in a vertical direction, defining a gasifier chamber and having a carbonaceous material feedstock inlet and a fluidized bed, the gasifier chamber being connected to a source of steam which is in communication with the fluidized bed;
   a freeboard area located vertically above the fluidized bed;
   an outlet coupled to the freeboard area to permit the exit of product gas from the gasifier chamber; and
   one or more fuel cell modules connected to the reaction vessel, each fuel cell module comprising a fuel cell element having a fuel cell anode portion immersed within the fluidized bed, the anode portion directly contacting the fluidized bed; wherein:
   each fuel cell element extends in a direction transverse to the longitudinal axis (A); and
   each fuel cell element is configured to:
   (a) accept $H_2$ and CO generated from carbonaceous material within the gasifier chamber;
   (b) electrochemically oxidize said $H_2$ and CO to produce power; and
   (c) output $H_2O$ and $CO_2$ into the fluidized bed with energy sufficient to sustain reforming and gasification reactions of said carbonaceous material and produce additional $H_2$ and CO.

17. The system according to claim 16, wherein
   each fuel cell module comprises:
   an oxidant manifold through which one or more of air, $O_2$ and enriched air are supplied to the fuel cell elements; and
   a spent oxidant plenum configured to provide to the removal of $N_2$ or $O_2$ and/or other gases that were not consumed by the fuel cell elements; and
   each fuel cell element is in the form of an elongated tube comprising an outer anode, an inner cathode and a ceramic electrode between outer anode and the inner cathode.

18. The system according to claim 17, further comprising:
   spaced apart first and second sets of indirect heater conduits protruding into the gasifier chamber from a sidewall of the reaction vessel; and
   spaced apart first and second sets of fuel cell elements protruding in the gasifier chamber from a sidewall of the reaction vessel; wherein
   the first and second sets of indirect heater conduits are between the first and second sets of fuel cell elements, along a longitudinal axis of the reaction vessel.

19. The system according to claim 18, wherein:
   the first and second sets of indirect heater conduits protrude into the gasifier chamber from a first wall of the reaction vessel;
   the first and second sets of fuel cell elements protrude into the gasifier chamber from a second wall of the reaction vessel, the second wall opposing the first wall; and
   at least some of the indirect heater conduits and at least some of the fuel cell elements overlap along the longitudinal axis.

20. The system according to claim 18, wherein:
   the carbonaceous material feedstock inlet is positioned between the first and second sets of indirect heater conduits, and is configured to introduce carbonaceous material into a drying and devolatilization zone within the gasifier chamber.

* * * * *